United States Patent
Mochizuki et al.

(10) Patent No.: US 7,898,392 B2
(45) Date of Patent: Mar. 1, 2011

(54) CONTROL METHOD, CONTROL SYSTEM, RFID ANTENNA AND CONNECTION INVESTIGATION METHOD

(75) Inventors: Tomoyuki Mochizuki, Yokohama (JP); Hideki Sano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1271 days.

(21) Appl. No.: 11/443,225

(22) Filed: May 31, 2006

(65) Prior Publication Data
US 2007/0188328 A1 Aug. 16, 2007

(30) Foreign Application Priority Data
Feb. 15, 2006 (JP) .............................. 2006-037587

(51) Int. Cl.
*H04Q 5/22* (2006.01)
(52) U.S. Cl. .................. 340/10.51; 340/10.3; 340/572.7
(58) Field of Classification Search ............... 340/10.1, 340/10.51, 572.1, 572.7, 10.3; 702/81, 85
See application file for complete search history.

(56) References Cited

U.S. PATENT DOCUMENTS

| | | | | |
|---|---|---|---|---|
| 6,084,512 A * | 7/2000 | Elberty et al. | ............ | 340/572.1 |
| 6,486,769 B1 * | 11/2002 | McLean | .................. | 340/10.32 |
| 6,677,852 B1 * | 1/2004 | Landt | .......................... | 340/10.1 |
| 6,714,121 B1 * | 3/2004 | Moore | ........................ | 340/10.3 |
| 6,903,656 B1 * | 6/2005 | Lee | ............................ | 340/572.1 |
| 7,108,185 B2 * | 9/2006 | McDonald | ............. | 235/462.01 |
| 7,583,193 B2 * | 9/2009 | Itoh et al. | ................. | 340/572.1 |
| 2003/0174099 A1 * | 9/2003 | Bauer et al. | .................. | 343/893 |
| 2006/0006986 A1 * | 1/2006 | Gravelle et al. | ............. | 340/10.3 |
| 2008/0129643 A1 * | 6/2008 | Itoh et al. | ..................... | 343/878 |

FOREIGN PATENT DOCUMENTS

| | | |
|---|---|---|
| JP | 2001-244845 | 9/2001 |
| JP | 2005-157645 | 6/2005 |
| WO | WO 2004/086337 | 10/2004 |
| WO | WO 2006/010076 | 1/2006 |

* cited by examiner

*Primary Examiner*—Edwin C Holloway, III
(74) *Attorney, Agent, or Firm*—Antonelli, Terry, Stout & Kraus, LLP.

(57) ABSTRACT

A technique of preventing occurrence of interference even when a plurality of RFID antennas are used simultaneously. Each RFID antenna is attached with a calibration RFID tag. A combination of RFID antennas that causes a problem is acquired based on whether information held by the calibration RFID tag can be read from each of the RFID antennas that have performed reading simultaneously. Then, an RFID antenna use procedure is generated such that the RFID antennas in the acquired combination are not used simultaneously. Each RFID antenna is operated according to the generated use procedure.

3 Claims, 12 Drawing Sheets

FIG. 3

| RFID READER/WRITER | RFID ANTENNA | CALIBRATION RFID TAG | ... |
|---|---|---|---|
| 21 | 211 | 216 | ... |
|  | 212 | 217 |  |
| 22 | 221 | 226 | ... |
|  | 222 | 227 |  |
| 23 | 231 | 236 | ... |
|  | 232 | 237 |  |

| APPLICATION | APPLICATION 1 | | | |
|---|---|---|---|---|
| USE REQUEST | RFID ANTENNA | OPERATION | FREQUENCY | ... |
| | 211 | READ | CONTINUOUS | ... |
| | 212 | READ | CONTINUOUS | ... |
| | 232 | WRITE | ONCE | ... |
| ... | ... | | | |

401 = APPLICATION row; 402 = USE REQUEST row; 411 = RFID ANTENNA; 412 = OPERATION; 413 = FREQUENCY

| APPLICATION | APPLICATION 2 | | | |
|---|---|---|---|---|
| USE REQUEST | RFID ANTENNA | OPERATION | FREQUENCY | ... |
| | 211 | READ | CONTINUOUS | ... |
| | 221 | READ | CONTINUOUS | ... |
| | 231 | READ | CONTINUOUS | ... |
| ... | ... | | | |

| COMBINATION 501 | | | SEVERITY 502 |
|---|---|---|---|
| 211 | 221 | | 5 |
| 221 | 231 | | 5 |
| 212 | 222 | | 5 |
| 222 | 232 | | 5 |
| 211 | 231 | 212 | 1 |

| 602 | 601 TIMING | 1 | | 2 |
|---|---|---|---|---|
| 611 CONTENT | RFID ANTENNA | 211 | | 212 |
| 612 | AP | AP1 | AP2 | AP1 |
| 611 CONTENT | RFID ANTENNA | 231 | | 221 |
| 612 | AP | AP2 | | AP2 |

FIG. 10

A PROBLEM HAS OCCURRED IN THE FOLLOWING COMBINATION

| RFID READER/WRITER | RFID ANTENNA | SEVERITY |
|---|---|---|
| 21 | 211 | 3 |
| 23 | 231 | |

THE USE PROCEDURE SHOULD BE CHANGED?

YES    NO

FIG. 11

A PROBLEM HAS OCCURRED IN THE FOLLOWING RFID ANTENNA

| RFID READER/WRITER | RFID ANTENNA |
|---|---|
| 21 | 211 |

| COMBINATION 501 | | | SEVERITY 502 |
|---|---|---|---|
| 211 | | 221 | 5 |
| 221 | | 231 | 5 |
| 212 | | 222 | 5 |
| 222 | | 232 | 5 |
| 211 | 231 | 212 | 1 |
| 212 | | 221 | 5 |

| | TIMING 602 / 601 | 1 | | 2 | | 3 |
|---|---|---|---|---|---|---|
| CONTENT | RFID ANTENNA | 211 | | 212 | | 221 |
| | AP | AP1 | AP2 | AP1 | AP2 | AP1 |
| CONTENT | RFID ANTENNA | 231 | | PAUSE | | PAUSE |
| | AP | AP2 | | PAUSE | | PAUSE |

CONFIGURATION HAS BEEN CHANGED

| | RFID READER/WRITER | RFID ANTENNA |
|---|---|---|
| OLD | 21 | 211 |
| NEW | 23 | 231 |

CONFIGURATION INFORMATION
SHOULD BE CHANGED?

YES  NO

CONTROL METHOD, CONTROL SYSTEM, RFID ANTENNA AND CONNECTION INVESTIGATION METHOD

BACKGROUND OF THE INVENTION

1. Field of the Invention

The present invention relates to a system using the RFID technique.

2. Description of the Prior Art

To access an RFID tag in the RFID (Radio Frequency Identification) technique, an RFID reader/writer transmits a carrier wave to the RFID tag through an RFID antenna connected to the RFID reader/writer. Receiving a carrier wave, the RFID tag reads data held in it and returns the data, for example. Or, receiving a carrier wave, the RFID tag writes data.

Sometimes, a plurality of RFID antennas are used in order to widen the read range for an RFID tag. In that case, an RFID antenna changer is introduced between an RFID reader/writer and RFID antennas. An RFID antenna changer connects one RFID reader/writer and a plurality of RFID antennas, and changes an antenna connected to the RFID reader/writer so that one antenna is activated among the plurality of antennas. Thus, one RFID reader/writer performs writing and reading through the activated RFID antenna.

However, according to the above-described method in which RFID antennas are changed and used one by one, the time required for reading becomes longer as the number of RFID antennas becomes larger. Thus, to shorten the read time, a plurality of RFID reader/writers are introduced and each RFID reader/writer is connected with a plurality of RFID antennas so that the plurality of RFID reader/writers are operated in parallel to perform reading. However, sometimes a combination of RFID antennas used at the same time causes interference between those RFID antennas, thus reducing the read rate.

Thus, Japanese Un-examined Patent Laid-Open No. 2005-157645 describes a technique in which reading order is determined in advance not to activate two adjacent RFID antennas at the same time. And, active RFID antennas are changed successively in that order to prevent interference between RFID antennas.

SUMMARY OF THE INVENTION

Conditions of occurrence of interference between RFID antennas depend on positional relationship between the RFID antennas and a location where the RFID antennas are positioned, and thus interference does not necessarily occur between adjacent RFID antennas. As a result, the technique described in the patent document 2005-157645 does not use the RFID antennas effectively. Further, sometimes interference occurs not only between adjacent RFID antennas but also between RFID antennas in above-and-below relation or between RFID antennas that are second from each other. Thus, it is possible that the technique described in 2005-15764 causes interference.

Further, as described above, conditions of occurrence of interference between RFID antennas depend on positional relationship between the RFID antennas and environment where the RFID antennas are positioned. The technique described in 2005-15764 determines in advance the procedure for using RFID antennas. Accordingly, in the case where a combination of RFID antennas causing interference changes as a result of a change of positional relationship between RFID antennas or a change in environment where the RFID antennas are positioned, it is necessary to determine a procedure for using the RFID antennas each time the positional relationship between the RFID antennas or the environment where the RFID antennas are positioned changes. As a result, the cost and time of changing the procedure for using the RFID antennas is entailed each time the environment or the positional relationship changes.

The present invention has been made considering the above situation. The present invention provides a technique that can use a plurality of RFID antennas effectively and can make RFID antennas operate concurrently without causing interference even when an un-supposed combination of RFID antennas causes interference or positional relationship between the RFID antennas or environment in which the RFID antennas are positioned changes.

According to the present invention, each RFID antenna is attached with a calibration RFID tag. A combination of RFID antennas that causes a problem is acquired based on whether information held by the calibration RFID tag can be read from each of the RFID antennas that have performed reading simultaneously. Then, an RFID antenna use procedure is generated such that the RFID antennas in the acquired combination are not used simultaneously. Each RFID antenna is operated according to the generated use procedure.

Further, the present invention provides a control method by an RFID control system comprising a plurality of RFID antennas each having a calibration RFID tag, one or more RFID reader/writers that perform reading by operating each of said RFID antennas, and a control unit that controls each of said RFID reader/writers, wherein: each of said RFID reader/writers performs: a read step in which the RFID reader/writer in question reads information held by a calibration RFID tag through an RFID antennas; and an output step in which the RFID reader/writer in question outputs the read information to said control unit; and said control unit performs; a read result acquisition step in which the control unit receives the information read by each of RFID antennas that are operated simultaneously from each of said RFID reader/writers; a combination acquisition step in which the control unit acquires a combination of RFID antennas that do not read information held by the respective calibration RFID tags; and a use procedure generation step in which the control unit generates a use procedure that includes one or more use timings each including one or more RFID antennas to be operated simultaneously, and RFID antennas included in one use timing do not coincide with the acquired combination; a control step in which the RFID antennas included in each of said use timings in the generated antenna use procedure are operated simultaneously.

According to the present invention, it is possible to operate even adjacent RFID antennas when they do not cause interference. Thus, RFID antennas can be used effectively. Further, it is possible to detect a combination of RFID antennas that causes interference when they are used simultaneously, to change a use procedure of RFID antennas. As a result, even when unexpected combination of RFID antennas causes interference, it is possible to generate a use procedure depending on the system configuration, positional relationship, environment, and the like. Further, even when the positional relationship or the environment changes, a use procedure adapted for that positional relationship or the environment can be generated. Thus, costs and time for changing a use procedure can be reduced.

BRIEF DESCRIPTION OF THE DRAWINGS

FIG. 3 is a diagram showing an example of RFID reader/writer configuration information in the same embodiment;

FIG. 4 is a diagram showing an example of antenna use request information in the same embodiment;

FIG. 5 is a diagram showing an example of antenna calibration information in the same embodiment;

FIG. 6 is a diagram showing an example of antenna use procedure information in the same embodiment;

FIG. 10 is a view showing an example of a screen for outputting a result in the same embodiment;

FIG. 11 is a view showing an example of a screen for outputting a result in the same embodiment;

FIG. 12 is a diagram showing an example of the antenna calibration information in the same embodiment;

FIG. 13 is a diagram showing an example of the antenna use procedure information in the same embodiment;

FIG. 15 is a view showing an example of a screen for outputting a result in the same embodiment.

DESCRIPTION OF THE PREFERRED EMBODIMENTS

Figure 1:
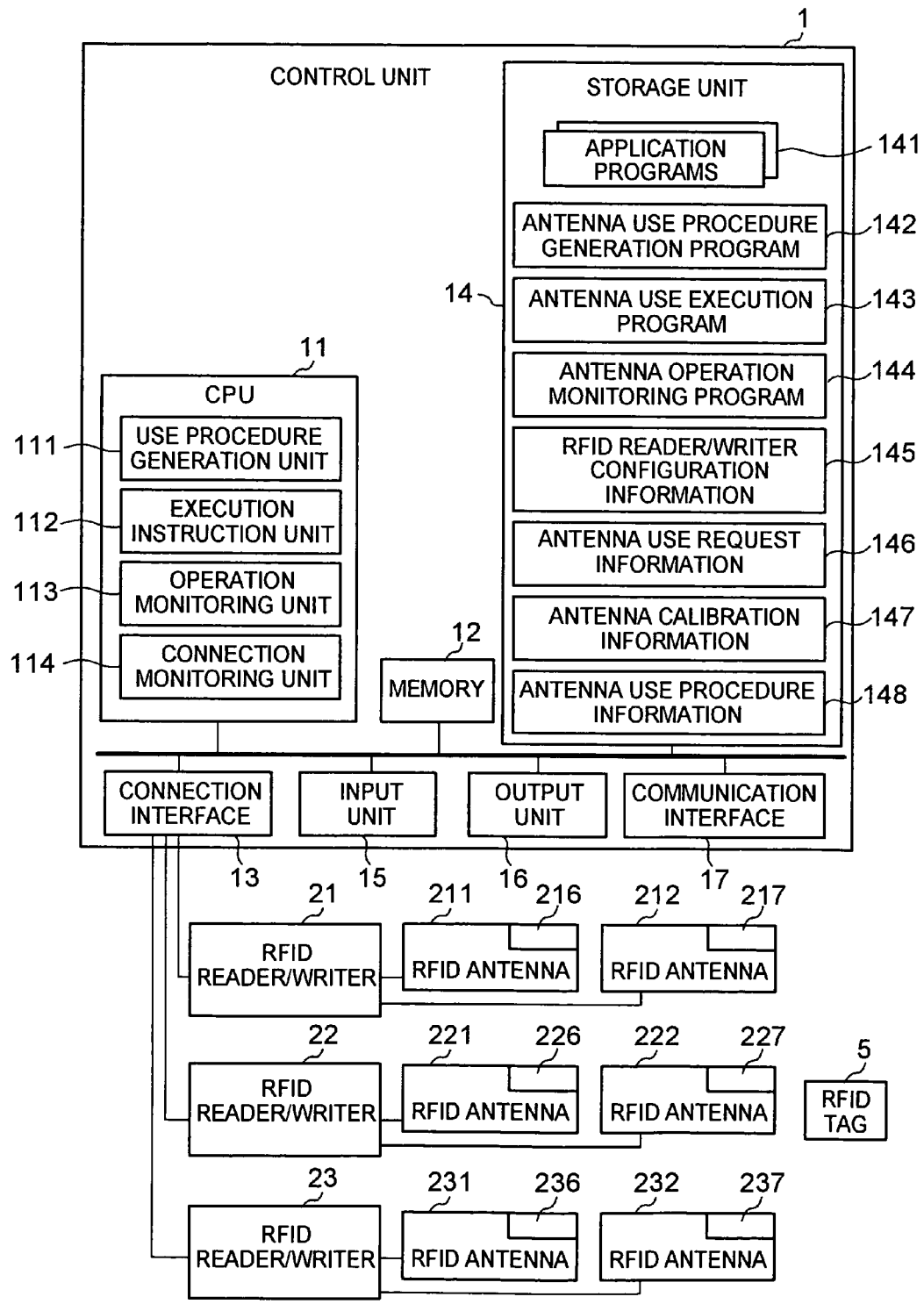
FIG. 1 is a diagram showing an example of a system configuration in one embodiment of the present invention.

Now, one embodiment of the present invention will be described in detail referring to the drawings.

FIG. 1 is a diagram showing an example of a configuration of the present embodiment. As shown in FIG. 1, a system of the present embodiment comprises: a control unit 1; RFID reader/writers 21-23; RFID antennas 211, 212, 221, 222, 231 and 232; and an RFID tag 5. The RFID antennas 211, 212, 221, 222, 231 and 232 have respective calibration RFID tags 216-237.

The control unit 1 is connected with the RFID reader/writers 21, 22 and 23. The RFID reader/writer 21 is connected with the RFID antennas 211 and 212, the RFID reader/writer 22 with the RFID antennas 221 and 222, and the RFID reader/writer 23 with the RFID antennas 231 and 232.

The control unit 1 acquires a combination of RFID antennas 211-232 that can not be activated at the same time, based on results of write and read to and from the calibration tags 216-237 of the RFID antennas 211-232 themselves. Then, based on the acquired combination and configuration information that has been previously stored in a storage unit, the control unit 1 generates a procedure for using the RFID reader/writers 21-23 and makes the RFID reader/writers 21-23 operates following the generated use procedure. Further, the control unit 1 previously stores information that should be read by each RFID antenna 211-232 in the storage unit. The control unit 1 compares a read result by each RFID antenna 211-232 of the RFID reader/writers 21-23 with the information that should be read, which is read from the storage unit, in order to judge whether each RFID antenna 211-232 is correctly connected or not. According to an instruction from the control unit 1, each of the RFID reader/writers 21, 22 and 23 activates one of the RFID antennas connected to itself (i.e. the RFID antennas 211 and 212, 221 and 222, or 231 and 232) and controls write and read. Each of the RFID antennas 211, 212, 221, 222, 231 and 232 performs writing and reading to and from the RFID tag 5 and the calibration RFID tag 216-237 held by itself.

Although not shown in FIG. 1, each RFID reader/writer is connected with its RFID antennas through an RFID antenna changer. Each RFID antenna changer comprises a plurality of connection interfaces (not shown) such as ports, each of which is connected with an RFID antenna. An RFID antenna changer may be built in the inside of an RFID reader/writer, or may be provided as a separate device from an RFID reader/writer. In the case where one RFID reader/writer is connected with one RFID antenna, an RFID antenna changer may not be used. An RFID antenna changer is conventional one, and its description will be omitted here.

Operation of each RFID reader/writer 21-23 for activating one of the RFID antennas 211-232 connected to itself and for controlling writing and reading is same as the operation in the conventional technique. It is different from the conventional technique that the RFID antennas 211-232 have the respective calibration RFID tags 216-237. However, operation of each RFID antenna 211-232 for performing writing and reading to and from the RFID tag 5 and its calibration RFID tag 216-237 is same as the operation in the conventional technique.

FIG. 1 shows that three RFID reader/writers are connected to the control unit 1. However, the number of RFID reader/writers is not limited to three, and any number of RFID reader/writers may be connected as far as possible. Further, FIG. 1 shows that each RFID reader/writer is connected with two RFID antennas. However, the number of RFID antennas is not limited to two, and each RFID reader/writer may be connected with any number of RFID antennas as far as possible.

Next, the configuration shown in FIG. 1 will be described in detail.

First, the control unit 1 will be described. The control unit 1 is an information processing unit such as a PC (Personal Computer) or a server for example. The control unit 1 comprises a CPU (Central Processing Unit) 11, a memory 12, a connection interface 13, the storage unit 14, an input unit 15, an output unit 16, and a communication interface 17. The storage unit 14 comprises: a writable and readable storage medium such as an HDD (Hard Disk Drive), a CD-R (Compact Disc-Recordable) or a DVD-RAM (Digital Versatile Disk-Random Access Memory) for example; and a storage medium drive unit. The storage unit 14 stores application programs 141, an antenna use procedure generation program 142, an antenna use execution program 143, an antenna operation monitoring program 144, RFID reader/writer configuration information 145, antenna use request information 146, antenna calibration information 147, antenna use procedure information 148, and the like.

The CPU 11 executes the antenna use procedure generation program 142 loaded into the memory 12, to realize a use procedure generation unit 111. Further, the CPU 11 executes the antenna use execution program 143 loaded into the memory 12, to realize an execution instruction unit 112. Further, the CPU 11 executes the antenna operation monitoring program 144 loaded into the memory 12, to realize an operation monitoring unit 113, a connection monitoring unit 114 and the like.

Based on the below-mentioned RFID reader/writer configuration information 145, antenna use request information 146 and antenna calibration information 147, the use procedure generation unit 111 generates an antenna use procedure information 148 that indicates the order and combinations of antennas to be used. The execution instruction unit 112 instructs an RFID antenna 211-232 to perform writing and reading according to the antenna use procedure 148 generated by the use procedure generation unit 111. The operation monitoring unit 113 updates the antenna calibration information 147 based on results of reading the calibration RFID tags 216-237. When it is judged from those results of reading that the antenna use procedure 148 should be changed, then the operation monitoring unit 113 outputs information about it, and further instructs the use procedure generation unit 111 to change the antenna use procedure 148. The connection monitoring unit 114 judges whether the RFID antennas 211-232 are connected to respective suitable positions based on information read by each RFID antenna 211-232 and the below-mentioned RFID reader/writer configuration information 145, and outputs the judgment results, at predetermined timing, for example.

The control unit 1 is connected with the RFID reader/writers 21-23 through the connection interface 13.

The application programs 141 are programs that execute processing using the RFID tag 5. As examples of the application programs 141, may be mentioned a stocktaking program for knowing an inventory of articles attached with respective RFID tags, an article information providing program for providing information on articles attached with respective RFID tags, and the like. One control unit 1 may be equipped with any number of application programs 141. Here, the description is given assuming that the control unit 1 is equipped with two application programs 141. In the following, when it is necessary to distinguish between respective applications realized by application programs 141, the applications will be referred to as "application 1" and "application 2" respectively.

The antenna use procedure generation program 142 is a program that realizes the use procedure generation unit 111. The antenna use execution program 143 is a program that realizes the execution instruction unit 112. And, the operation monitoring program 144 is a program that realizes the operation monitoring unit 113.

The RFID reader/writer configuration information 145 is information on a configuration of the RFID reader/writers managed by the control unit 1 and the RFID antennas connected to each RFID reader/writer. The antenna use request information 146 indicates information of conditions of RFID reader/writers and RFID antennas used for each application program 141. The antenna calibration information 147 is information on combinations of RFID antennas that cause a problem when those antennas are used simultaneously.

The input unit 15 is, for example, a keyboard, a mouse, a scanner, a microphone or the like. The output unit 16 is, for example, a display, a speaker, a printer, or the like. The control unit 1 is connected with a communication device of another information processing unit (not shown) or the like through the communication interface 17.

In FIG. 1, one control unit 1 has the use procedure generation unit 111, the execution instruction unit 112, the operation monitoring unit 113, the RFID reader/writer configuration information 145, the antenna use request information 146, the antenna calibration information 147, the antenna use procedure 148, and the like. However, some of them may exist in another information processing unit (not shown) connected through the communication network 17 so as to perform the below-described processing in a distributed manner.

Next, will be described the RFID reader/writers 21-23. The RFID reader/writers 21-23 are connected to the control unit 1 through the connection interface 13. These RFID reader/writers are same as the conventional one except that the RFID reader/writers control operation of the RFID antennas 211-232 according to an instruction of the control unit 1 as described below. In the present embodiment, the RFID antenna changing function is provided between the RFID reader/writers 21-23 and the RFID antennas 211-232, as described above. Further, each RFID reader/writer 21-23 has an anti-collision function that allows reading of a plurality of RFID tags at a time. This anti-collision function may be realized by the conventional ALOHA system, for example.

Next, will be described the RFID antennas 211-232.

Each of the RFID antennas 211-232 is same as the conventional one used for RFID except that the RFID antennas 211-232 have their respective calibration RFID tags 216-237. Each of the calibration RFID tags 216-237 is same as the conventional one except that these calibration RFID tags 216-237 are arranged in the respective RFID antennas 211-232 and used for the below-described operation. Each calibration RFID tag 216-237 is either an active tag having a battery within it or a passive tag without having a battery within it. Further, each calibration RFID tag 216-237 may be read-only, or both readable and writable. Here, the description will be given assuming that each calibration RFID tag is read-only. Each calibration tag 216-237 holds a tag ID. Here, it is assumed that a part of a tag ID is used for differentiating a calibration RFID tag from another type of tag 5. In other words, a tag ID of each calibration RFID tag 216-237 includes identification information indicating that the tag in question is a calibration RFID tag. The control unit 1 judges whether a predetermined area of a tag ID that has been read includes predetermined identification information, in order to judge whether the tag ID is a tag ID of some calibration RFID tag 216-237 or the tag ID of the RFID tag 5, according to the below-described operation.

A tag ID does not necessarily includes the identification information for differentiating a calibration RFID tag from another type of tag 5. For example, the identification information may be included in a user data area other than a tag ID area. Further, the method of differentiating a calibration RFID tag from another tag 5 is not limited to this. For example, the storage unit 14 may have a table or the like for storing a list of tag IDs of the calibration RFID tags. When a tag ID is read, it is judged whether the table includes the read tag ID to identify the tag as a calibration RFID tag or another RFID tag 5.

The calibration RFID tags 216-237 may be integrated with the respective RFID antennas 211-232. Or, the calibration RFID tags 216-237 may be simply put at any positions in the neighborhoods of the RFID antennas 211-232, respectively. Further, one RFID antenna may have a plurality of calibration RFID tags. However, since the calibration RFID tags 216-237 are used for detecting interference between the RFID antennas 211-232 as described below, it is needless to say that a calibration RFID tag of an RFID antenna should be positioned such that the calibration RFID tag can be read accurately and does not respond to reading by another RFID antenna.

Figure 2A:
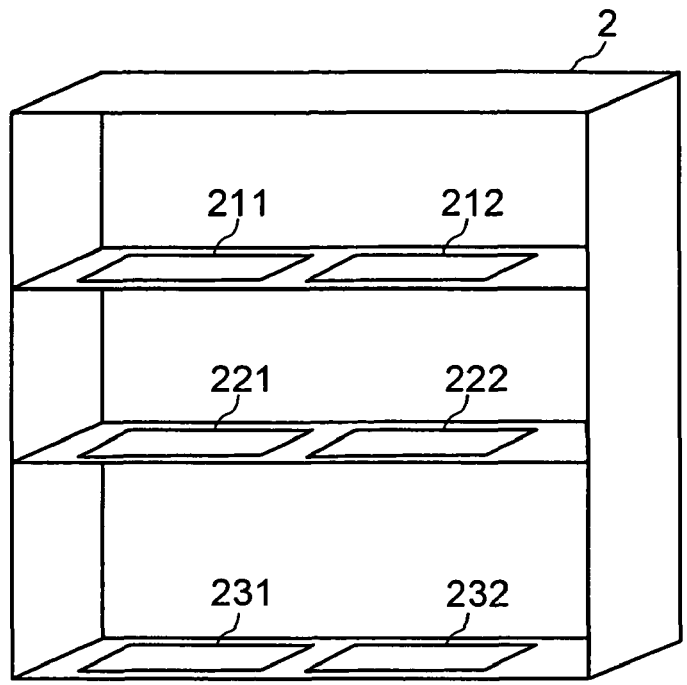
FIG. 2 is a diagram showing an example of arrangement of RFID antennas and a calibration RFID tag in the same embodiment.
Figure 2B:
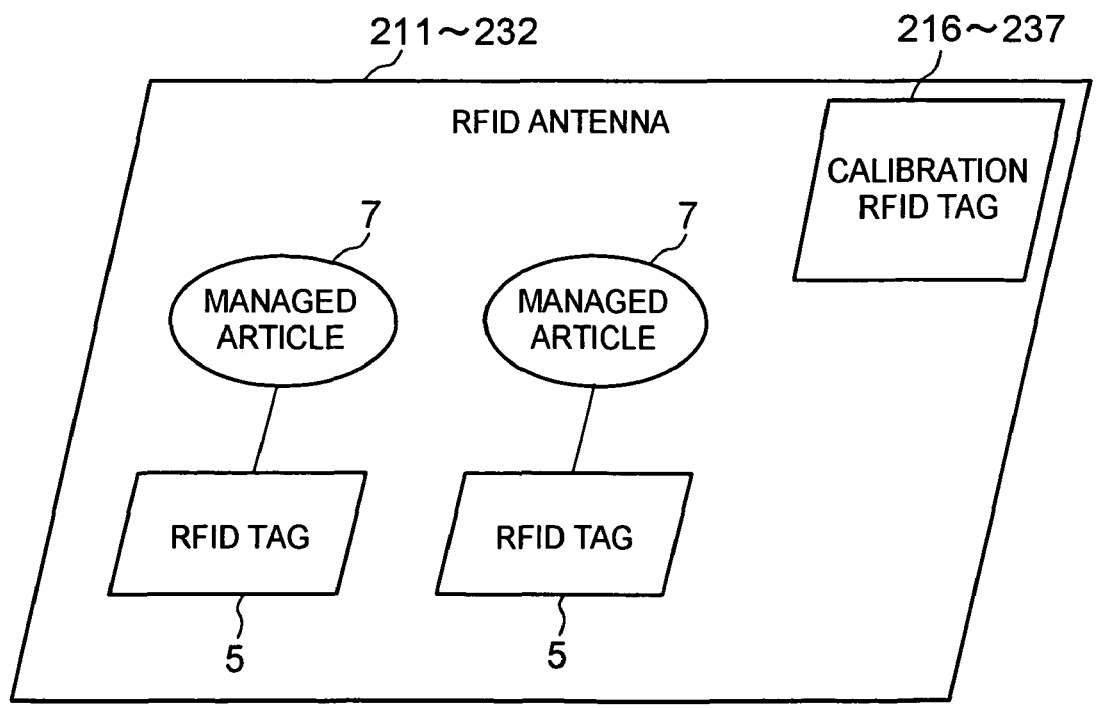

An example of arrangement of the RFID antennas 211-232 will be described referring to FIG. 2. FIG. 2(a) shows an example of arrangement of the RFID antennas 211-232 in a cabinet 2. The RFID antennas 211 and 212 are placed on the first board of the cabinet 2, the RFID antennas 221 and 222 on the second board, and the RFID antennas 231 and 232 on the third board. FIG. 2(b) shows an enlarged example of one of the RFID antennas arranged in the cabinet shown in the example of FIG. 2(a). Each of the RFID antennas 211-232 can perform writing and reading with respect to an RFID tag 5 that is arranged within its read range. For example, by previously attaching RFID tags 5 to managed articles 7, it is possible to realize a stocktaking program that can grasp the inventory status of the articles.

The arrangement of the RFID antennas shown in FIG. 2 is an example, and arrangement is not limited to this. Arrangement of RFID antennas can be freely determined according to the intended use of the RFID antennas.

Next, will be described an example of the RFID reader/writer configuration information referring to FIG. 3.

FIG. 3 shows an example of the RFID reader/writer configuration information 145. The RFID reader/writer configuration information 145 includes an RFID reader/writer 301, an RFID antenna 302, a calibration RFID tag 303, and the like. The RFID reader/writer 301, the RFID antenna 302, the calibration RFID tag 303 and the like are associated with one another. The RFID reader/writer 301 is identification information indicating an RFID reader/writer connected to the control unit 1, for example, information that indicates a port number of the control unit 1, to which the RFID reader/writer is connected. The RFID antenna 302 is identification information indicating an RFID antenna connected to the corresponding RFID reader/writer 301, for example, information that indicates a port number of the RFID reader/writer, to which the RFID antenna is connected. The calibration RFID tag 303 is identification information indicating a calibration RFID tag given to the corresponding RFID antenna 302. For example, the information of the calibration RFID tag 303 is a tag ID held by that calibration RFID tag 303.

The RFID reader/writer configuration information 145 may be previously stored in the storage unit 14. Or, the RFID reader/writer configuration information 145 may be newly stored, added or deleted according to information inputted through the input unit 15, the communication interface 17 or the like. Further, in the case where the control unit 1 can detect connection of a new RFID reader/writer to the control unit 1 through USB (Universal Serial Bus) connection, Ethernet (registered trademark) connection or the like or disconnection of an RFID reader/writer registered already in the RFID reader/writer configuration information 145, the information of the RFID reader/writer 301 may be newly stored in, added to or deleted from the RFID reader/writer configuration information 145. Similarly, in the case where the control unit 1 or each RFID reader/writer can detect connection of a new RFID antenna or disconnection of a connected RFID antenna, the information of the RFID antenna 302 and the calibration RFID tag 303 may be newly stored in, added to or deleted from the RFID reader/writer configuration information 145 according to the content detected by the control unit 1 itself or the identification information of the added or disconnected RFID antenna sent from the RFID reader/writer concerned. An example of operation for updating an RFID antenna 302, a calibration RFID tag 303 and the like in the RFID reader/writer configuration information 145 will be described later.

Next, an example of the antenna use request information 146 will be described referring to FIG. 4.

FIG. 4 shows an example of the antenna use request information 146. FIG. 4(a) shows antenna use request information 146 for the application 1, and FIG. 4(b) for the application 2. In the following, when the description should differentiate between these pieces of antenna use request information 146, they are referred to as "antenna use request information 146a" and "antenna use request information 146b" using reference numerals added with respective suffixes.

In FIG. 4(a), the antenna use request information 146 includes an application 401, a use request 402, and the like. The application 401 is a name, identification information, or the like that indicates an application program to be executed. The use request 402 includes an RFID antenna 411, operation 412, a frequency 413, and the like. The RFID antenna 411, the operation 412, the frequency 413, and the like are associated with one another. The RFID antenna 411 is information indicating an RFID antenna that performs writing and reading when the corresponding application 401 is executed. For example, the RFID antenna 411 is information that indicates a port number of an RFID reader/writer, to which the RFID antenna is connected. The operation 412 is information indicating whether the corresponding RFID antenna 411 performs reading or writing when the corresponding application 401 is executed. The frequency 413 indicates the number of times the corresponding RFID antenna 411 performs the corresponding operation 412. When the frequency 413 is "continuous", it means that the corresponding RFID antenna 411 performs the corresponding operation 412 continuously unless a stop instruction or the like is issued. When the frequency 413 is "once", it means that the RFID antenna 411 performs the corresponding operation 412 when an instruction is received.

An example of the antenna use request information 146 shown in FIG. 4(b) has the same items as ones of the example of the antenna use request information 146 shown in FIG. 4(a), and only specific contents of the information are different. Thus, FIG. 4(b) is shown without giving detailed description of it.

In the present embodiment, it is assumed that the control unit 1 has the antenna use request information 146 as described above for every application that performs writing and reading to and from RFID tags. It is assumed that information in the antenna use request information 146 is previously stored in the storage unit 14. However, the information may be newly stored, changed or deleted according to information inputted through the input unit 15, the communication interface 17 or the like.

Next, will be described an example of the antenna calibration information 147 referring to FIG. 5.

A shown in FIG. 5, the antenna calibration information 147 includes a combination 501, severity 502, and the like. The combination 501, the severity 502 and the like are associated with one another. The combination 501 indicates a combination of RFID antennas that causes a problem when those antennas are used simultaneously. Thus, one combination 501 includes respective pieces of identification information or the like of a plurality of RFID antennas. For example, a piece of identification information is information that indicates a port number of an RFID reader/writer connected with the RFID antenna concerned, similarly to the above. The severity 502 indicates severity of a problem caused when the corresponding combination 501 of RFID antennas is used. In the example shown in FIG. 5, the severity 502 is expressed in five grades. The larger the number indicated by the severity 502 is, the severer a problem caused by use of the corresponding combination 501 of RFID antennas is.

The antenna calibration information 147 may be set when the system is constructed, or before operation of the system, or when the system is operated. In the case where the antenna calibration information 147 is set when the system is constructed, a user or another person registers combinations of RFID antennas that seem to cause problems considering positional relationship between RFID antennas. In the case where the antenna calibration information 147 is set before or at the time of operating the system, the operation monitoring unit 113 detects and registers combinations of RFID antennas that cause problems on the basis of statuses of reading the calibration RFID tags according to the below-described operation.

Next, will be described an example of the antenna use procedure information 148 referring to FIG. 6.

As shown in FIG. 6, the antenna use procedure 148 includes timing 601, a content 602, and the like. The timing 601, the content 602 and the like are associated with one another. The timing 601 indicates a turn to use an RFID antenna. The content 602 includes an RFID antenna 611, an application (shown as "AP" in FIG. 6 and another figure) 612 and the like. The RFID antenna 611, the application 612 and the like are associated with one another. The RFID antenna 611 is identification information or the like of an RFID antenna used at the corresponding timing 601, and, for example, is information that indicates a port number or the like of an RFID reader/writer to which the RFID antenna is connected. The application 612 indicates an application that performs writing and reading through the corresponding RFID antenna 611.

The antenna use procedure information 148 has one or more contents 602. Each content 602 indicates an RFID antenna that is activated at the corresponding timing 601. Thus, in the case where a plurality of antennas are activated at a timing, the antenna use procedure information 148 includes contents 602 whose number is same as the number of RFID antennas activated. For example, the antenna use procedure information 148 of FIG. 6 shows that two RFID antennas "211" and "231" are activated simultaneously at the timing "1". The number of contents 602 corresponding to a timing 601 may be any number.

It is assumed that the antenna use procedure information 148 exists for each pattern of using a plurality of antennas that are used simultaneously when one or more applications are executed. For example, in the case where the control unit 1 can execute "application 1" and "application 2" as described above and there are three operation patters, i.e. execution of "application 1" only, execution of "application 2" only, and execution of both "application 1" and "application 2", the antenna use procedure information 148 exists for each of these three application patterns. Here will be described only the case where both "application 1" and "application 2" are executed. Accordingly, the application 612 in the example of the antenna use procedure information 148 shown in FIG. 6 includes two applications as described above. However, the number of applications is not limited to this, and any number of applications may be included.

Information of the antenna use procedure information 148 may be previously stored in the storage unit 14, or may be newly stored, added or deleted according to information inputted through the input unit 15 or the communication interface 17. The contents of the antenna use procedure information 148 stored in the storage unit 14 are subjected to update or other processing according to the below-described operation.

Next, will be described an example of operation of the system shown in FIG. 1.

Figure 7:
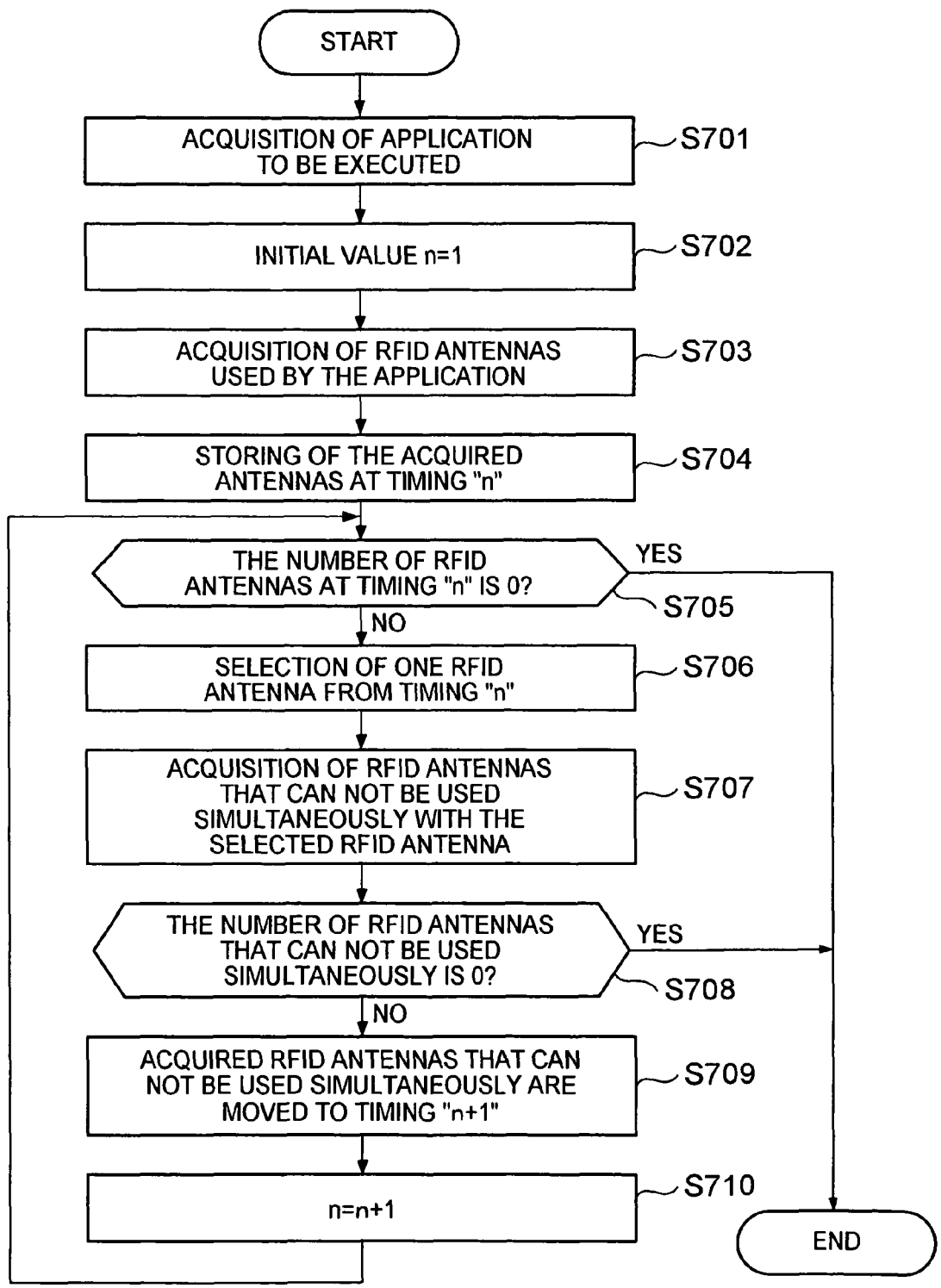
FIG. 7 is a flowchart showing an example of operation for generating the antenna use procedure information in the same embodiment.

First, referring to FIG. 7, will be described an example of operation for generating the antenna use procedure information 148. This operation is activated at any timing. As an activation timing, may be mentioned: the time of inputting an instruction through the input unit 15 or the communication interface 17; predetermined time intervals; the time of detecting a change in the configuration of the RFID reader/writers and the RFID antennas; or the time of changing the RFID reader/writer configuration information 145, the antenna use request information 146, the antenna calibration information 147 or the like, for example.

The use procedure generation unit 111 acquires applications to be executed (S701). In the case where the operation of FIG. 7 is activated through the input unit 15 or the communication interface 17, these applications may be ones inputted together with the instruction of the activation. Or, in the case where the operation of FIG. 7 is activated at the predetermined intervals, or at the time of detecting a change in the configuration of the RFID reader/writers and the RFID antennas, or at the time of changing the RFID reader/writer configuration information 145, the antenna use request information 146, the antenna calibration information 147 or the like, these applications may be ones inputted through the input unit 15 or the communication interface 17 or ones designated by information read from the storage unit 14. Further, in the case where the antenna use procedure information 148 has been already stored in the storage unit 14, these applications may be acquired by reading the applications 612 from the antenna use procedure information 148. Here, any number of applications may be acquired. It is assumed that the use procedure generation unit 111 acquires "application 1" and "application 2".

Next, the use procedure generation unit 111 sets an initial value of a variable "n" as "n=1" (S702). Next, the use procedure generation unit 111 acquires RFID antennas used in the application acquired in S701 (S703). Further, the use procedure generation unit 111 stores the RFID antennas acquired in S703 and the application acquired in S701 into the RFID antenna 611 and the application 612 corresponding to the timing 601 "n" in the antenna use procedure information 148 (S704). For example, to that end, the use procedure generation unit 111 reads the antenna use request information 146 whose application 401 coincides with the application acquired in S701 from the storage unit 14, and reads RFID antennas 411 each associated with the frequency 413 "continuous" from the antenna use request information 146. Then, the use procedure generation unit 111 stores the identification information or the like of the antennas acquired in S703 into the RFID antennas 611 corresponding to the timing 601 in the antenna use procedure information 148, and stores the application 401 of the read antenna use request information 146 into the applications 612 corresponding to those RFID antennas 611. In the case where a plurality of applications have been acquired in S701, the use procedure generation unit 111 performs the above processing for each of those applications. In that case, when the antenna use procedure information 148 already stores the same RFID antenna 611, then the use procedure generation unit 111 stores the application in question (application different from the already-stored application) into the application 612 corresponding to the same RFID antenna 611.

For example, will be described in detail the case where "n=1" and "application 1" and "application 2" are acquired in S701 as described above. The use procedure generation unit 111 reads the antenna use request information 146a whose application 401 is "application 1" as shown in FIG. 4(a) from the storage unit 14, and reads the RFID antennas 411 "211" and "212" associated with the frequency 413 "continuous" from the antenna use request information 146a. The use procedure generation unit 111 stores "211" and "212", which have been read, into RFID antennas 611 corresponding to the timing 601 "1". Further, the use procedure generation unit 111 stores "application 1" to respective applications 612 corresponding to these RFID antennas 611. Next, the use procedure generation unit 111 reads the application use request information 146b whose application 401 is "application 2" as shown in FIG. 4(b) from the storage unit 14, and reads the RFID antennas 411 "211", "221" and "231" associated with the frequency 413 "continuous" from the antenna use request information 146b. Here, "211" among the read RFID antennas 411 has been already stored in an RFID antenna 611 corresponding to the timing 601 "1". Thus, the use procedure generation unit 111 stores "application 2" i.e. information indicating the application in question into the application 612 corresponding to that RFID antenna 611 "211". Further, the use procedure generation unit 111 stores the RFID antennas 411 "211" and "212", which do not overlap with an already-stored RFID antenna 611, into RFID antennas 611 corresponding to the timing 601 "1", and further stores "application 2" to the respective applications 612 corresponding to those RFID antennas 611.

Next, the use procedure generation unit 111 judges whether the number of RFID antennas at the timing "n" is "0" or not (S705). To that end, the use procedure generation unit 111 read the antenna use procedure information 148 from the storage unit 14 and judges whether the antenna use procedure information 148 includes an RFID antenna 411 associated with the timing 601 "n".

When the number of RFID antennas at the timing "n" is "0" in the judgment of S705, the use procedure generation unit 111 ends the operation for generating the antenna use procedure information 148.

When the number of RFID antennas at the timing "n" is not "0" in the judgment of S705, then the use procedure generation unit 111 selects, for example in descending order, one of the RFID antennas associated with the timing 601 "n" in the antenna use procedure information 148 (S706). Next, based on the RFID reader/writer configuration information 145 and the antenna calibration information 147, the use procedure generation unit 111 acquires RFID antennas that cause a problem when they are used simultaneously with the RFID antenna selected in S706 (S707). To that end, the use procedure generation unit 111 reads the RFID antenna 302 containing the RFID antenna selected in S706, from the RFID reader/writer configuration information 145, and judges whether, in the read content of the RFID antenna 302, there exists an RFID antenna that is included in the RFID antennas 411 associated with the timing 601 "n", other than the RFID antenna selected in S706. Further, the use procedure generation unit 111 reads combinations 501 that include each the RFID antenna selected in S706, from the antenna calibration information 147, and judges whether, among the RFID antennas included in the read combinations 501, there exists an RFID antenna that is included in the RFID antennas 411 associated with the timing 601 "n", other than the RFID antenna selected in S706. Instead of the above judgment based on the antenna calibration information 147, the use procedure generation unit 111 may read combinations 501 each having the severity 502 larger than or equal to a predetermined value and including the RFID antenna selected in S706, from the antenna calibration information 147, and then judge whether, among the RFID antennas included in the read combinations 501, there exists an RFID antenna included in the RFID antennas 411, other than the RFID antenna selected in S706. When these judgments show existence of RFID antennas satisfying the above conditions, the use procedure generation unit 111 judges that those RFID antennas are ones that cause a problem when they are used simultaneously with the RFID antenna selected in S706, and stores those RFID antennas into, for example, a predetermined area of the memory 12.

For example, will be described in detail the case where "n=1", and the antennas 611 associated with the timing 601 "1" in the antenna use procedure information 148 store "211", "212", "221" and "231" by the above-described operation of S704, and the RFID antenna "211" is selected in S706. The use procedure generation unit 111 reads the RFID antenna 302 registering "211" and "212" i.e. containing the RFID antenna "211", from the RFID reader/writer configuration information 145 shown in FIG. 3, and extracts the RFID antenna "212" other than the RFID antenna "211" selected in S706, from the read contents of the RFID antenna 302. The extracted RFID antenna "212" is included in the antennas 611 associated with the timing 601 "1" in the antenna use procedure information 148. Consequently, the use procedure generation unit 111 judges that the RFID antenna "212" causes a problem when it is used simultaneously with the RFID antenna "211" selected in S706, and stores the RFID antenna "212" into, for example, the predetermined area of the memory 12.

Further, the use procedure generation unit 111 reads a combination 501 registering "211" and "221" and a combination 501 registering "211", "212" and "231" both including the RFID antenna "211", from the antenna calibration information 147 shown in FIG. 5. Then, the use procedure generation unit 111 extracts RFID antennas "212", "221" and "231" other than the RFID antenna "211" selected in S706, among the RFID antennas in the read combinations 501. The extracted RFID antennas "212", "221" and "231" are included in the antennas 611 associated with the timing 601 "1" in the antenna use procedure information 148. Consequently, the use procedure generation unit 111 judges that the RFID antennas "212", "221" and "231" cause a problem when they are used simultaneously with the RFID antenna "211" selected in S706, and stores them into, for example, the predetermined area of the memory 12.

Further, instead of the above-described judgment based on the antenna calibration information 147, the use procedure generation unit 111 may read only combinations that are each associated with the severity 502 of "3" or more and each include the RFED antenna "211" selected in S706, from the antenna calibration information 147 shown in FIG. 5. In the case of the antenna calibration information 147 shown in FIG. 5, a combination 501 containing "211" and "221" is associated with the severity 502 of "3" or more and, at the same time, includes the RFID antenna "211" selected in S706. In this case, the use procedure generation unit 111 extracts the RFID antenna "221" other than the RFID antenna "211" selected in S706, among the RFID antennas in the read combination 501. The extracted RFID antenna "221" is included in the RFID antennas 611 associated with the timing 601 "1" in the antenna use procedure information 148. Consequently, the use procedure generation unit 111 judges that the RFID antenna "221" causes a problem when it is used simultaneously with the RFID antenna "211" selected in S706, and stores the RFID antenna "221" into, for example, the predetermined area of the memory 12.

The use procedure generation unit 111 judges whether the number of RFID antennas that cause a problem when they are used simultaneously with the RFID antenna selected in S706 is "0" or not (S708).

When the judgment in S708 shows that the number of RFID antennas causing a problem at simultaneous use with the RFID antenna selected in S706 is "0", then the use procedure generation unit 111 ends the processing of generating the antenna use procedure information 148.

When the judgment in S708 shows that the number of RFID antennas causing a problem at simultaneous use with the RFID antenna selected in S706 is not "0", then the use procedure generation unit 111 moves the RFID antennas acquired in S707 from the RFID antennas 611 associated with the timing 601 "n" to RFID antennas 611 associated with the timing 601 "n+1". Further, following the movement of those RFID antennas 611, the use procedure generation unit 111 moves the data of the applications 612 associated with those RFID antennas 611 to applications 612 associated with the timing "n+1" (S709).

For example, will be described in detail the case where the antennas "211", "212", "221" and "231" are stored into the antennas 611 associated with the timing 601 "1" in the antenna use procedure information 148, "application 1" is stored into the applications 612 associated with the antennas 611 "211" and "212", "application 2" is stored into the applications 612 associated with the antennas 611 "211", "221" and "231", and the RFID antennas "212" and "221" are acquired in S707. The use procedure generation unit 111 deletes the RFID antennas "212" and "221" acquired in S707 from the antennas 611 "211", "212", "221" and "231" associated with the timing 601 "1" in the antenna use procedure information 148, and further deletes the applications 612 "application 1" and "application 2" associated with the RFID antennas 611 "212" and "221". As a result, the antennas "211" and "231" remain as the antennas 611 associated with the timing 601 "1", and the applications 612 associated with the antenna 611 of "211" become "application 1" and "application 2", and the application 612 associated with the antenna 611 of "231" becomes "application 2".

Further, the use procedure generation unit 111 stores the RFID antennas "212" and "221" acquired in S707 into antennas 611 associated with the timing 601 "2", i.e. the timing "n+1". And, the use procedure generation unit 111 stores "application 1" into the application 612 associated with the RFID antenna 611 "212, and "application 2" into the application 612 associated with the RFID antenna 611 "221".

When the above step S708 shows that the number of RFID antennas causing a problem at simultaneous use with the RFID antenna selected in S706 is "0", or after the processing of the above step S709, it may be judged whether the antennas associated with the timing "n" includes an RFID antenna that has not been selected in the processing of S706. When it is judged that an unselected RFID antenna is included, the above processing of S706 may be performed again to select an unselected RFID antenna and to perform the processing following it similarly to the above. Or, when it is judged that an unselected RFID antenna does not remain, the processing may be ended similarly to the above, or the below-described processing of S710 may be performed.

Next, the use procedure generation unit 111 increments "n" to "n=n+1" (S710), and performs the processing of S705 again for the new timing "n".

According to the above-described operation, the control unit 1 generates the antenna use procedure information 148, an example of which is shown in FIG. 6, from the RFID reader/writer configuration information 145, the antenna use request information 146 and the antenna calibration information 147, examples of which are shown in FIGS. 3-5.

In the above example of operation, the use procedure generation unit 111 generates one piece of antenna use procedure information 148 and ends the processing at that step. However, the operation is not limited to this. The use procedure generation unit 111 may generate pieces of antenna use procedure information 148, and select one that allows writing and reading to and from all the RFID tags 5 in the shortest time among those pieces of antenna use procedure information 148. For example, to that end, it is favorable that the use procedure generation unit 111 changes the order in which the RFID antennas are selected in S706, to perform the above-described operation, and judges that a piece of antenna use procedure information 148 whose maximum value of the timing 601 is smallest among the generated pieces of antenna use procedure information 148 is one that allows writing and reading of all the RFID tags 5 in the shortest time.

Figure 8:
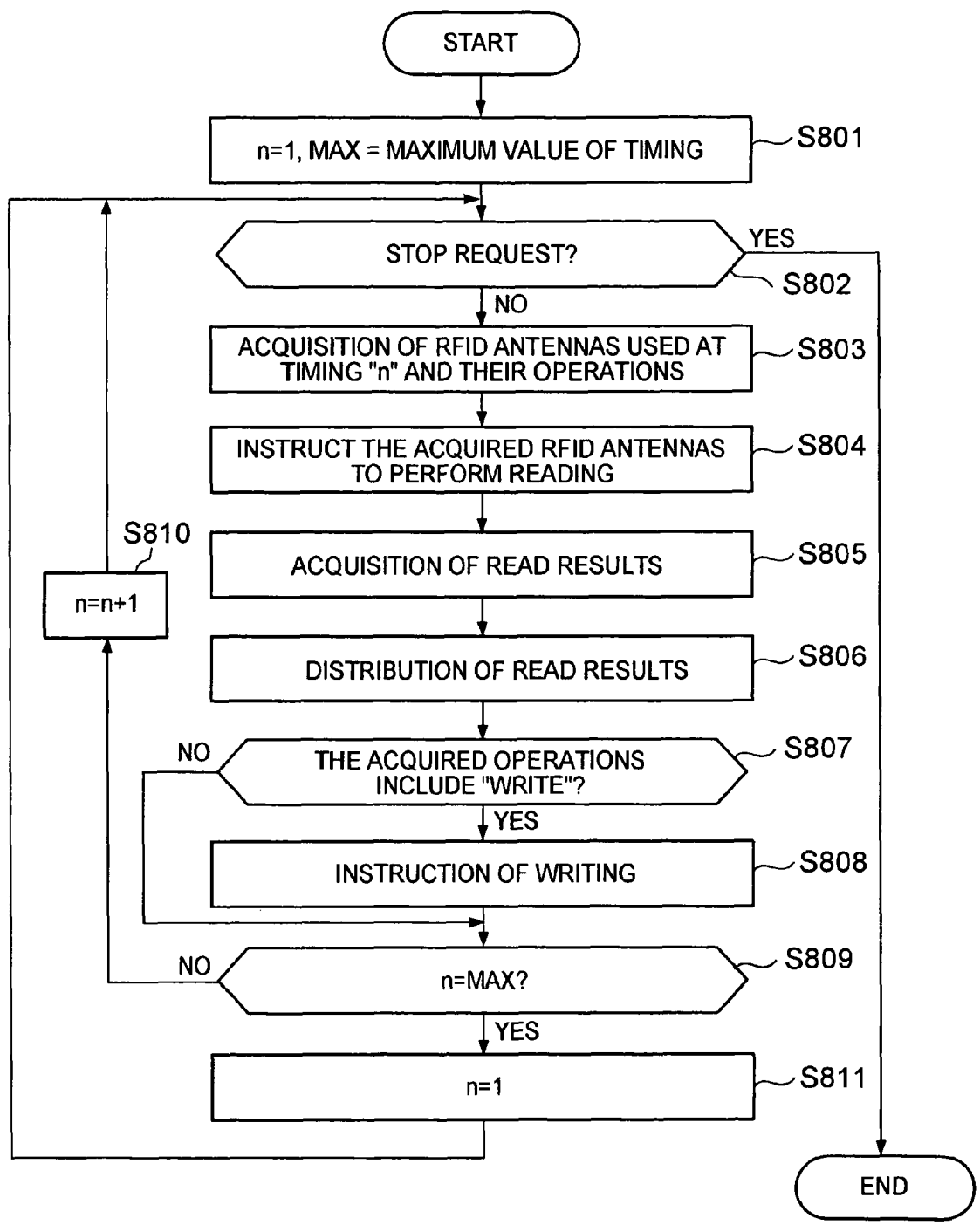
FIG. 8 is a flowchart showing an example of operation for making RFID antennas operate in the same embodiment.

Next, referring to FIGS. 8 and 9, will be described an example of operation for activating applications and performing writing and reading to and from RFID tags 5. FIG. 8 shows an example of operation of the execution instruction unit 112, and FIG. 9 an example of operation of the operation monitoring unit 113. In the present embodiment, it is assumed that when an activated application performs writing and reading to and from an RFID tag 5, operation of the execution instruction unit 112 and operation of the operation monitoring unit 113 are activated at the same time. However, this is not limiting, and the execution instruction unit 112 and the operation monitoring unit 113 may be activated at different points of time. For example, the operation monitoring unit 113 may be activated at any timing, such as at the time the antenna use procedure information 148 is updated, at the time the control unit 1 is activated, at predetermined intervals, or the like.

In the following operation example, will be described the case where "application 1" and "application 2" are executed concurrently. The execution instruction unit 112 and the operation monitoring unit 113 are activated by one or both of "application 1" and "application 2", or by another program (not shown) that makes "application 1" and "application 2" operate being linked with each other.

In FIG. 8, the execution instruction unit 112 sets initial values as "n=1" and "MAX=the maximum value of timing" (S801). Here, "the maximum value of timing" means the maximum value of timing at which writing and reading to and from RFID tags 5 are performed. To acquire "the maximum value of timing", the use procedure generation unit 111 reads the antenna use procedure information 148 whose application 612 contains the activated application, reads the maximum value of the timings 601 from the read antenna use procedure information 148, and sets "MAX" to this value. In detail, in the case where, for example, activated applications are "application 1" and "application 2", the execution instruction unit 112 reads the maximum value "2" of the timing 601 from the antenna use procedure information 148 exemplified in FIG. 6 and sets "MAX=2".

Next, the execution instruction unit 112 judges whether an application or the like has requested a stop (S802). For example, the execution instruction unit 112 makes this judgment by reading a flag that indicates a stop request. The flag is in a predetermined area of the memory 12 and changed by an active application program.

When the judgment in S802 shows that a stop has been requested, the execution instruction unit 112 ends processing of writing and reading to and from an RFID tag 5. In the case where a plurality of applications are active, the execution instruction unit 112 may end the processing either when a part of the applications requests a stop or when all the applications request a stop.

When the judgment in S802 shows that a stop has not been requested, the execution instruction unit 112 acquires the RFID antennas used at the timing "n" and the respective operations executed by those RFID antennas, from the antenna use procedure information 148 (S803). For example, to that end, the execution instruction unit 112 reads the RFID antennas 611 and the applications 612 associated with the timing 601 "n" from the antenna use procedure information 148 that has been read in the above processing and contains the active applications in the applications 612. Next, the execution instruction unit 112 reads pieces of the antenna use request information 146 whose applications 401 coincide with the read applications 612 respectively, from the storage unit 14. Then, the execution instruction unit 112 reads the respective operations 412 that are associated with the RFID antennas 411 coincident with the read RFID antennas 611 and that are each associated with the frequency 413 "continuous", from those pieces of antenna use request information 146. Then, the execution instruction unit 112 stores each combination of the read application 612, the read RFID antenna and the operation into a predetermined area of the memory 12.

In detail, for example in the case of "n=1", the execution instruction unit 112 reads the RFID antennas 611 "211" and "231" and the applications 612 "application 1" and "application 2" associated with the timing 601 "1" from the antenna use procedure information 148 shown in FIG. 6. Next, the execution instruction unit 112 reads the operation 412 "read" associated with the RFID antenna 411 "211" and the frequency 413 "continuous" from the antenna use request information 146 shown in FIG. 4(*a*). Similarly, the execution instruction unit 112 reads the operation 412 "read" associated with the RFID antenna 411 "231" and the frequency 413 "continuous" from the antenna use request information 146 shown in FIG. 4(*b*).

Next, the execution instruction unit 112 instructs the RFID antennas acquired in S803 to perform reading (S804). For example, to that end, the execution instruction unit 112 selects one of the RFID antennas acquired in S803; reads an RFID reader/writer 301 associated with an antenna 302 that coincides with the selected RFID antenna, from the RFID reader/writer configuration information 145; and stores the RFID reader/writer 301 together with the application, the RFID antenna and the operation stored above, into a predetermined area of the memory 12. In the case where there are pieces of antenna use request information 146 each containing an antenna 411 coincident with one of the RFID antennas acquired in S803, the execution instruction unit 112 performs the above processing for each piece of the antenna use request information 146. Next, the execution instruction unit 112 reads a combination of an application, an RFID reader/writer, an RFID antenna and operation, from the predetermined area of the memory 12, and outputs an instruction to the read RFID reader/writer through the connection interface 13 to perform reading using the read RFID antenna.

In the case where the predetermined area of the memory 12 stores a plurality of combinations each consisting of an application, an RFID reader/writer, an RFID antenna and operation, then the execution instruction unit 112 performs the similar processing for each RFID reader/writer.

In detail, will be described the example where RFID antenna "211" and "231", operation "read", and applications "application 1" and "application 2" are acquired in S803. First, the execution instruction unit 112 selects the RFID antenna "211". Next, the execution instruction unit 112 reads the RFID reader/writer 301 "21" that is associated with the RFID antenna 302 "211", from the RFID reader/writer configuration information 145 shown in FIG. 3. The execution instruction unit 112 stores the read RFID reader/writer "21" and other information together with the already-stored RFID antennas "211" and "231", operation "read", applications "application 1" and "application 2" into the predetermined area of the memory 12. Next, the execution instruction unit 112 selects the RFID antenna "231" that has not been selected between the RFID antennas acquired in S803 and performs the processing similar to the above. In that case, the execution instruction unit 112 reads the RFID reader/writer "23" and other information, and stores the RFID reader/writer "23" and other information together with the RFID antennas "211" and "231", the operation "read", and the applications "application 1" and "application 2" into the predetermined area of the memory 12. Next, the execution instruction unit 112 outputs a "read" instruction to the RFID reader/writer "21" to perform reading through the RFID antenna "211". In detail, for example, the execution instruction unit 112 outputs a command or the like of instructing the RFID reader/writer connected to the port number "21" of the connection interface 13 to perform reading through the RFID antenna connected to the port number "211". Further, the execution instruction unit 112 outputs a "read" instruction to the RFID reader/writer "23" to perform reading through the RFID antenna "231". In detail, for example, the execution instruction unit 112 outputs a command or the like of instructing the RFID reader/writer connected to the port number "22" of the connection interface 13 to perform reading through the RFID antenna connected to the port number "231".

Each RFID reader/writer that is instructed in the above processing to perform reading follows the instruction. Namely, each RFID reader/writer performs read operation through the designated RFID antenna by changing the antenna through the above-mentioned antenna changer if necessary. The reading operation is same as the operation of the conventional technique, and its description is omitted here. Each RFID reader/writer may perform reading any number of times or only once. Here, the description is given assuming that reading is performed a plurality of times. The control unit 1 may designates the number of times of reading when it gives the above-mentioned read instruction. Or, the number of times of reading may be stored in advance in a storage unit (not shown) held by the RFID reader/writer concerned. In the case where the control unit 1 designates the number of times of reading, the control unit 1 may change the number of times of reading, depending on the application, the RFID antenna, operation, the RFID reader/writer, the calibration RFID tag, and the like. Here, it is assumed that the number of times of reading is determined in advance as "five times".

When each RFID reader/writer performs reading through the designated RFID antenna, the RFID reader/writer outputs data acquired by the reading to the control unit 1. As described above, the communication range of each RFID antenna covers the RFID tags 5 and the calibration RFID tag. Accordingly, the data read by the RFID reader/writer are data such as a tag ID and the like read from each RFID tag 5 and a tag ID read from the calibration RFID tag. The RFID reader/writer outputs the read information held by the RFID tags 5 and the tag ID in the calibration RFID tag to the control unit 1.

The execution instruction unit 112 of the control unit 1 acquires the result of reading instructed in S804 (S805). This result is the information inputted through the connection interface 13.

Here, the execution instruction unit 112 of the control unit 1 may perform the processing from the below-described step S806, awaiting a predetermined time after the processing of the above S804. Or, the execution instruction unit 112 may synchronize ends of use of all the RFID antennas acquired in the above step S803, and perform the processing from S806 after the processing of all the simultaneously-used RFID antennas is ended.

In the case where the processing from S806 is performed awaiting the predetermined time after the processing of S804, favorably the execution instruction unit 112 acquires the time elapsed from the instruction in S804 by using an internal clock (not shown), and performs the processing from S806 when the elapsed time becomes equal to or larger than the predetermined value read from the storage unit 14 or the like. The predetermined value may be varied depending on the application, the RFID antenna, the operation and the RFID reader/writer designated in the processing of the above step S804.

Further, in the case where ends of use of all the RFID antennas acquired in S803 are synchronized, it is favorable to determine in advance a time required for each type of processing performed at each point of time, and to await elapse of the maximum time among the times required for the processes performed at that point of time. Or, it is favorable to wait until all the results of reading performed at the same point of time have been inputted into the control unit 1.

In the case of determining previously a time required for each type of processing performed at each point of time, it is favorable that each required time is previously stored in association with an RFID antenna 411, operation 412 and frequency 413 of the antenna use request information 146. In that case, it is favorable to acquire a required time simultaneously with the acquisition of the operation 412 and the like in the above operation of generating the antenna use procedure information 148, and to store the acquired required time in association with the RFID antenna 611 and the application 612 for each timing 601. In the above-described processing of S803, the execution instruction unit 112 acquires the maximum value among the required times associated with the timing 601 "n", simultaneously with the acquisition of the RFID antennas. Then, after performing the next processing in S804, the execution instruction unit 112 awaits elapse of the acquired maximum value of time before performing the below-described processing in and after S806.

Further, in the case of waiting until all the results of processing performed at the same timing have been inputted to the control unit 1, the execution instruction unit 112 performs the below-described processing in and after S806 when write results and read data inputted through the connection interface 13 are inputted from all the RFID reader/writers that have been instructed in S804 to perform the processing.

For example, assuming that reading by the RFID antenna 211 takes 1000 milliseconds and reading by the RFID antenna 231 800 milliseconds, the execution instruction unit 112 waits 200 milliseconds after reading by the RFID antenna 231, i.e. until the end of reading by the RFID antenna 211, before performing the processing in and after S806.

The execution instruction unit 112 distributes the inputted read results into the application programs 141 concerned and the antenna operation monitoring program 144 (S806). For example, to that end, the execution instruction unit 112 extracts a tag ID of a calibration RFID tag from the read data inputted from each RFID reader/writer, and stores the extracted tag ID and the value of "n" into a predetermined area of the memory 12. Here, the area is used for distribution to the antenna operation monitoring program 144. To differentiate between a tag ID read from a calibration RFID tag and a tag ID held by an RFID tag 5, the execution instruction unit 112, for example, refers to a predetermined part of a read tag ID and judges that the tag ID is read from a calibration tag ID when the predetermined part coincides with predetermined data. Further, the execution instruction unit 112 distributes the remaining processing results of each RFID reader/writer into the application programs 141. To that end, the execution instruction unit 112 refers to the information on the applications, the RFID antennas, the operations, the RFID reader/writers, the calibration RFID tags and the like used for the instructions in the above step S804. The information is stored in the predetermined area of the memory 12. Then, based on the information, the execution instruction unit 112 distributes the remaining processing results of each RFID reader/writer into the application programs 141. Here, in the case where the operation acquired in S803 is "write", the execution instruction unit 112 does not need to distribute read data to the application associated with the "write" operation.

For example, will be described in detail the case where "n=1" and a combination of the applications "application 1" and "application 2", the RFID antenna "211" and the RFID reader/writer "21" and a combination of the application "application 2", the RFID antenna "231" and the RFID reader/writer "23" are stored in the predetermined area of the memory 12. In that case, the execution instruction unit 112 extracts the tag ID read from the calibration RFID tag from the data (which include tag IDs) inputted through the RFID antenna 211, and stores the extracted tag ID together with the value "n=1" into the predetermined area of the memory 12. Further, the execution instruction unit 112 stores the remaining data into a predetermined area of the memory 12. The area is used for delivery to the application programs 141 "application 1" and "application 2". Further, the execution instruction unit 112 extracts the tag ID read from the calibration RFID tag from the data (which include tag IDs) inputted through the RFID antenna 231, and stores the remaining data into the predetermined area of the memory 12, which is used for delivery to the application program 141 "application 2".

Next, the execution instruction unit 112 judges whether the operations acquired in S803 include "write" (S807). To that end, the execution instruction unit 112 judges whether the predetermined area of the memory 12 includes "write".

When the judgment in S807 shows that the operations acquired in S803 include "write", the execution instruction unit 112 instructs the RFID antenna that should perform writing to perform writing (S808). For example, to that end, the execution instruction unit 112 selects a combination including the "write" operation out of the combinations each consisting of the application, the RFID antenna, the operation, and the RFID reader/writer. Those combinations are stored by the above-described operations in S803, S804 and the like. Then, the execution instruction unit 112 outputs an instruction to the RFID reader/writer included in the selected combination to perform writing through the RFID antenna included in the selected combination. At that time, the execution instruction unit 112 read the data to be written, from the predetermined area of the memory 12, and outputs the data together with the instruction.

Receiving the write instruction, the RFID reader/writer writes the data outputted from the control unit 1 to the RFID tag 5 through the designated RFID antenna, and output the write result to the control unit 1. This operation is same as the operation in the conventional technique, and its description is omitted here.

Next, the execution instruction unit 112 judges whether "n=MAX" is satisfied or not (S809).

When the judgment in S809 shows that "n=MAX" is not satisfied, the execution instruction unit 112 increments "n" to "n=n+1" (S810), and performs the above judgment in S802 again.

When the judgment in S809 shows that "n=MAX" is satisfied, then the execution instruction unit 112 sets "n" as "n=1" (S811), and performs the above judgment in S802 again.

Next, referring to FIG. 9, will be described an example of operation of the operation monitoring program 144. Here, the operation is activated simultaneously with the operation exemplified in FIG. 8.

Figure 9:
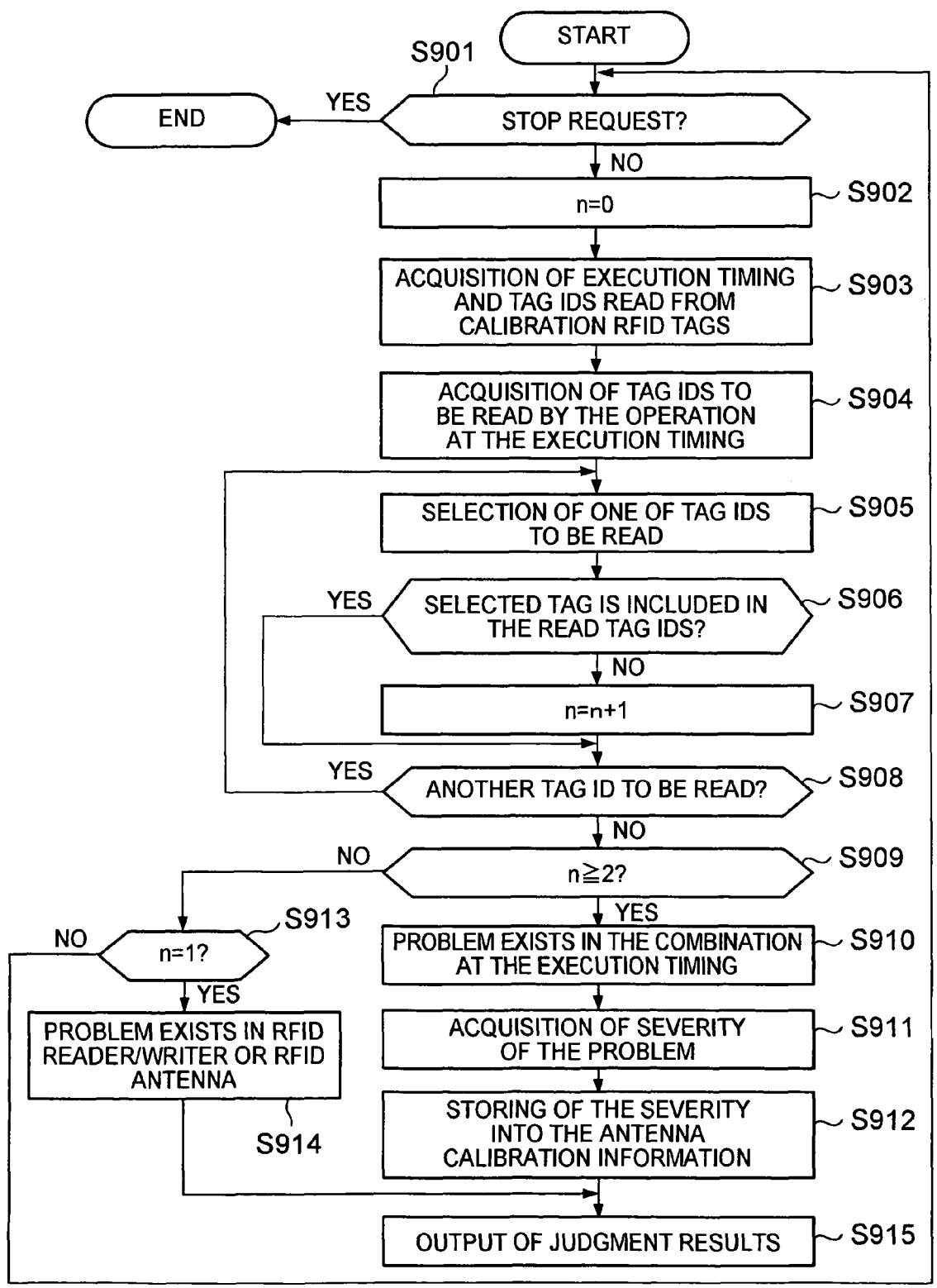
FIG. 9 is a flowchart showing an example of operation for acquiring a combination of RFID antennas whose concurrent use causes a problem in the same embodiment.

In FIG. 9, the operation monitoring unit 113 judges whether application program 141 or the like has requested a stop (S901). This operation is same as the operation in S802, and its description is omitted here.

When the judgment in S901 shows that a stop of the processing has been requested, the operation monitoring unit 113 ends the processing.

When the judgment in S901 shows that a stop of the processing has not been requested, the operation monitoring unit 113 sets the initial value of "n" as "n=0" (S902). Then, the operation monitoring unit 113 acquires the timing of execution by the operation monitoring unit 113 and the tag IDs read from the calibration RFID tags, which have been distributed by the operation in the above step S806 (S903). For example, to that end, the operation monitoring unit 113 reads the tag IDs, the value indicating the timing and the like stored by the execution instruction unit 112 in the processing of S806, from the predetermined area of the memory 12.

Next, the operation monitoring unit 113 acquires the tag IDs to be read by the processing at the acquired timing (S904). To that end, the operation monitoring unit 113 reads the RFID antennas 612 associated with the timing 601 that coincides with the value indicating the timing, which is acquired in S902, from the antenna use procedure information 148 of the storage unit 14. Next, the operation monitoring unit 113 reads the calibration RFID tags 303 associated with the RFID antennas 302 that coincide with the read RFID antennas, from the RFID reader/writer configuration information 145. The operation monitoring unit 113 determines the read calibration RFID tags 303 as the tag IDs to be read by the processing at the acquired timing.

Next, the operation monitoring unit 113 selects one of the tag IDs acquired in S904 (S905). Then, the operation monitoring unit 113 judges whether the tag ID selected in S905 is included in the tag IDs acquired in S903 (S906). As described above, here the RFID reader/writer performs reading a plurality of times. When the number of the tag IDs that are same as the tag ID selected in S905 and included in the tag IDs acquired in S903 does not coincide with the number of times of reading, then the operation monitoring unit 113 judges that a problem exists in the RFID antenna attached with the calibration RFID tag of that tag ID. Further, when one RFID antenna is given with a plurality of calibration RFID tags and all the calibration RFID tags have not been read the same number of times to read, then the operation monitoring unit 113 judges that a problem has occurred in the RFID antenna attached with those calibration RFID tags.

When the judgment in S906 shows that the tag ID selected in S905 does not exist in the tag IDs acquired in S903, the operation monitoring unit 113 increments "n" as "n=n+1" (S907).

When the judgment in S906 shows that the tag ID selected in S905 exists in the tag IDs acquired in S903, or after the processing of S907, the operation monitoring unit 113 judges whether an unselected tag ID exists in the tag IDs acquired in S904 (S908).

When the judgment in S908 shows that an unselected tag ID exists in the tag IDs acquired in S904, then the operation monitoring unit 113 performs the processing of S905 again to select on of unselected tag IDs.

When the judgment in S908 shows that an unselected tag ID does not exist in the tag IDs acquired in S904, then the operation monitoring unit 113 judges whether "n>=2" is satisfied or not (S909).

When the judgment in S909 shows that "n>=2" is satisfied, the operation monitoring unit 113 judges that a problem may exist in the combination of RFID antennas for which the processing has been performed at the timing acquired in S903 (S910), and acquires the severity of the problem (S911). Any operation for determining the severity may be employed. For example, with respect to a tag ID that is judged in S906 to be non-existent, the operation monitoring unit 113 may determine the severity of the problem by the number of times the tag ID in question is included in the tag IDs acquired in the processing of S903. For example, to that end, with respect to a tag ID that is judged in S906 to be non-existent, the operation monitoring unit 113 counts the number of times the tag ID is included in the tag IDs acquired in S903. For example, it is assumed that an RFID reader/writer has one calibration RFID tag and performs reading five times. When the tag ID of the mentioned calibration RFID tag is judged to be non-existent in S906 and the tag IDs acquired in S903 include two tag IDs that are same as the tag ID in question, then the operation monitoring unit 113 determines the severity as "3".

The operation monitoring unit 113 stores a combination of RFID antennas that causes a problem, together with the severity of the problem, into the antenna calibration information 147 (S912). Here, the combination of RFID antennas that causes a problem means a plurality of RFID antennas that are attached with calibration RFID tags having tag IDs judges to be non-existent in S906. For example, to acquire these RFID antennas, the operation monitoring unit 113 reads the RFID antenna 302 associated with the calibration RFID tag 303 that coincides with a tag judged to be non-existent in S906, from the RFID reader/writer configuration information 145. The operation monitoring unit 113 performs this processing for each tag ID that is judged to be non-existent in S906. The operation monitoring unit 113 stores a combination of RFID antennas that causes a problem and the severity acquired in S911 as a combination 501 and severity 502 into the antenna calibration information 147.

When the judgment in S909 shows that "n>=2" is not satisfied, the operation monitoring unit 113 judges whether "n=1" is satisfied or not (S913).

When the judgment in S913 shows that "n=1" is satisfied, then the operation monitoring unit 113 judges that either an RFID antenna or the RFID reader/writer using the RFID antenna or both may have a problem (S914). Here, an RFID antenna having a problem and an RFID reader/writer having a problem means an RFID antenna attached with a calibration RFID tag of a rag ID that is judged to be non-existent in S906 and the RFID reader/writer that uses the RFID antenna. For example, to acquire such an RFID antenna and an RFID reader/writer, the operation monitoring unit 113 reads an RFID antenna 301 associated with a calibration RFID tag 303 that coincides with a tag ID judged to be non-existent in S906 and an RFID reader/writer using that RFID antenna 301, from the RFID reader/writer configuration information 145.

When the judgment in S913 shows that "n=1" is not satisfied, then the operation monitoring unit 113 judges that no problem has occurred, and performs the operation of S901 again.

After the processing of S912 or S914, the operation monitoring unit 113 outputs information on occurrence of a problem through the output unit 16 and the communication interface 17 (S915). Here, FIG. 10 shows an example of screen of the output unit 16 such as a display in the case where there exists a possibility that a combination of RFID antennas has caused a problem. In FIG. 10, the screen example 1001 shows RFID antennas each attached with a calibration RFID tag having a tag ID that is selected in S905 and judged in S906 to be non-existent in tag IDs acquired in S903, RFID reader/writers that respectively use those RFID antennas, and the severity acquired in S911. When, for example, the user inputs an instruction to change the use procedure through the input unit 15 or the communication interface 17, then the operation monitoring unit 113 activates the use procedure generation unit 111 to perform the operation exemplified in FIG. 7 again.

FIG. 11 shows an example of screen of the output unit 16 such as a display in the case where either an RFID antenna or an RFID reader/writer or both may have caused a problem. In FIG. 11, the screen example 1101 shows an RFID antenna attached with a calibration RFID tag having a tag ID that is selected in S905 and judged in S906 to be non-existent in tag IDs acquired in S903, and an RFID reader/writer that uses the RFID antenna.

When it is judged in S906 that a tag ID selected in S905 is not existent in tag IDs acquired in S903, then the operation monitoring unit 113 may stop the operation of the active application program 141 or the operation of the execution instruction unit 112 and the like, by issuing an interrupt command, for example. Such a stop may be made when the severity acquired by the processing of S911 is more than or equal to a predetermined level.

For example, will be described the case where the operation of FIG. 9 indicates occurrence of a problem of the severity "5", the antenna calibration information 147 is updated, and as a result, the antenna calibration information 147 shown in FIG. 5 becomes the information shown in FIG. 12. The antenna calibration information 147 exemplified in FIG. 12 is different from the antenna calibration information 147 shown in FIG. 5 in that a combination 501 of "212" and "221" having the severity 502 of "5" is added. In this case, the execution instruction unit 112 stops the operation shown in FIG. 8 according to, for example, an instruction from the user or the operation monitoring unit 113. Further, the use procedure generation unit 111 executes the operation shown in FIG. 7 according to, for example, an instruction from the user or the operation monitoring unit 113. Since the combination 501 of "212" and "221" having the severity 502 of "5" is added to the antenna calibration information 147, the content 602 associated with the timing 601 "2" shown in FIG. 6 is changed. FIG. 13 shows an example of the antenna use procedure information 148 generated by the use procedure generation unit 111 based on the antenna calibration information 147 shown in FIG. 12. In FIG. 13, "pause" in a content 602 shows that an RFID antenna is not used at the corresponding timing 601. For example, FIG. 13 shows that only the RFID antenna "212" is used at the timing "2", and only the RFID antenna "221" at the timing "3". The method of synchronizing use and pause of RFID antennas is same as the above method. Thus, by making a pause instead of use of an RFID antenna, the end point of timing is synchronized. A pause may come at the top or in the middle of a timing period. When the execution instruction unit 112 is activated again, the execution instruction unit 112 controls the RFID antennas according to the antenna use procedure information shown in FIG. 13.

Next, referring to FIG. 14, will be described an example of operation of the connection monitoring unit 114.

When the judgment in S913 shows that "n=1" is satisfied and the operation monitoring unit 113 judges in the operation in S914 that a problem may exist in either an RFID antenna or the RFID reader/writer using that RFID antenna or in both of them, the operation monitoring unit 113 activates the connection monitoring unit 114. The activated connection monitoring unit 114 performs the below-described operation. Timing at which the connection monitoring unit 114 is activated is not limited to this. For example, the connection monitoring unit 114 may be activated at any timing to perform the below-described operation, for example, when the processing in S910 shows possibility of a problem in a combination of RFID antennas, or at the time of activation of the control unit 1, or at predetermined intervals.

Figure 14:
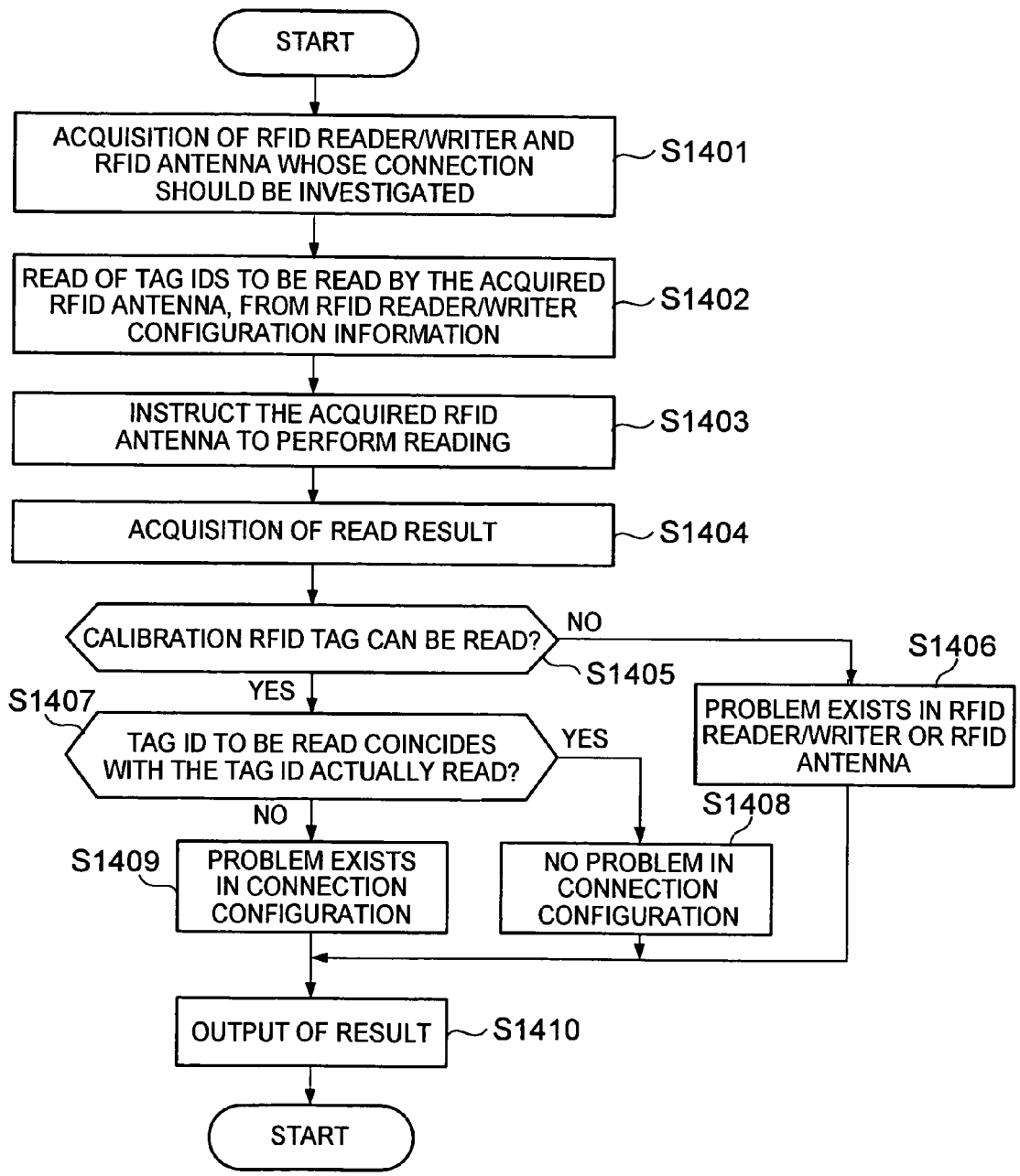
FIG. 14 is a flowchart showing an example of operation for investigating a configuration in the same embodiment.

As shown in FIG. 14, the connection monitoring unit 114 acquires an RFID antenna whose connection should be investigated (S1401). In the case where the connection monitoring unit 114 is activated by the operation monitoring unit 113, the operation monitoring unit 113, for example, stores the information indicating an RFID antenna and an RFID reader/writer judged to cause a problem, into a predetermined area of the memory 12. The connection monitoring unit 114 reads the information indicating the RFID antenna and the RFID reader/writer, which has been stored by the operation monitoring unit 113, from the predetermined area of the memory 12. In the case where the predetermined area of the memory 12 stores pieces of information each indicating a combination of an RFID antenna and an RFID reader/writer, the connection monitoring unit 114 selects one of these pieces of information. Further, in the case where the connection monitoring unit 114 is activated at any timing, such as at the time of activation of the control unit 1, the connection monitoring unit 114 selects one RFID antenna in descending order from the RFID reader/writer configuration information 145, for example.

The connection monitoring unit 114 reads the tag ID that should be read through the RFID antenna acquired in S1401, from the RFID reader/writer configuration information 145 (S1402). For example, to that end, the connection monitoring unit 114 reads a calibration RFID tag 303 associated with an RFID antenna 302 that coincides with the RFID antenna acquired in S1401, from the RFID reader/writer configuration information 145.

The connection monitoring unit 114 instructs the RFID antenna acquired in S1401 to perform reading (S1403). For example, to that end, the connection monitoring unit 114 outputs an instruction of reading using the RFID antenna read in the above operation to the read RFID reader/writer through the connection interface 13.

The connection monitoring unit 114 acquires a result of reading instructed in S1403 (S1404). This result is information inputted through the connection interface 13.

The connection monitoring unit 114 judges whether the read result acquired in S1404 shows a tag ID read from the calibration RFID tag (S1405). To that end, the connection monitoring unit 114 judges whether the information acquired in S1404 includes a tag ID that contains the identification information indicating a calibration RFID tag.

When the judgment in S1405 shows that the information of the calibration RFID tag can not be read, the connection monitoring unit 114 judges that a problem such as a breakdown or a connection error has occurred in at least one of the RFID antenna acquired in S1401, the calibration RFID tag attached to that RFID antenna and the RFID reader/writer connected with that RFID antenna (S1406), and performs the below-described operation in S1410.

When the judgment in S1405 shows that the information of the calibration RFID tag can be read, the connection monitoring unit 114 judges whether the tag IDs acquired in S1402 and S1404 coincide with each other (S1407).

When those tag IDs coincide in the judgment of S1407, then the connection monitoring unit 114 judges that no problem exists in the connection configuration (S1408), and performs the below-described processing in S1410.

When those tag IDs does not coincide in the judgment of S1407, then the connection monitoring unit 114 judges that a problem exists in the connection configuration (S1409), and performs the processing in S1410.

In the case where the operation is activated by the operation monitoring unit 113 as described above, the judgment may be made based on read conditions of the tag IDs acquired in the above step S903, not based on the result of the above steps S1402-S1404. In that case, the connection monitoring unit judges whether the number of the tag IDs acquired in S903 coincides with the number of tag IDs to be read, the later being acquired in the processing in S904. When the judgment shows that those numbers do not coincide, then the connection monitoring unit 114 makes the same judgment as in S1406, namely, judges that a problem such as a breakdown or a connection error has occurred in at least one of the RFID antenna, the calibration RFID tag attached to that RFID antenna and the RFID reader/writer connected with that RFID antenna. Or, when the judgment shows that those numbers coincide, the connection monitoring unit 114 makes the same judgment as in S1409, namely judges that no problem exists in the connection configuration.

The connection monitoring unit 114 outputs the judgment results of S1405 and S1407 through the output unit 15 and the communication interface 17 (S1410). The same screen example as the one of FIG. 11 is outputted when it is judged in S1405 that the information of the calibration RFID tag can not be read. Further, FIG. 15 shows an example of screen that is outputted on the output unit 16 such as a display when it is judged in S1407 that those tag IDs do not coincide. In FIG. 15, a screen example 1501 displays a combination of the RFID reader/writer and the RFID antenna acquired in S1401 and the information indicating the RFID antenna attached with the calibration RFID tag that has the tag ID acquired in S1404. Here, when for example the user inputs an instruction of changing the configuration information through the input unit 15 or the communication interface 17, the connection monitoring unit 114 can change the configuration information of the RFID reader/writer configuration information 145. For example, to that end, the connection monitoring unit 114 overwrites the calibration RFID tag 303 associated with the RFID antenna 302 that is coincident with the RFID antenna acquired in S1401, using the tag ID acquired in S1404.

When the judgment in S910 shows possibility of a problem in combinations of RFID antennas and the operation monitoring unit 113 activates the connection monitoring unit 114, then favorably the connection monitoring unit 114 performs the above-described processing for all the combinations of RFID antennas that are each judged to be problematic by the operation monitoring unit 113. In that case, the output of results in S1410 may be carried out after the processing has been performed for all the RFID antennas. Or, the results may be outputted after the processing has been performed for a part of the RFID antennas.

An RFID antenna according to the conventional technique does not have a function of protecting identification information, for example. In the case where a plurality of RFID antennas are connected to one RFID reader/writer of the conventional technique, the RFID reader/writer designates a connection interface such as a port number in order to designate an RFID antenna through which reading and writing should be performed. Accordingly, the RFID reader/writer can not judge whether correct RFID antennas are connected to itself, and, for example, an administrator investigates the configuration visually. As described above, when the connection monitoring unit 114 compares the information held by a calibration RFID tag with the previously-stored information, it becomes easy to judge whether RFID antennas are connected correctly. Further, when it can be judged that the configuration of the RFID antennas has been changed, it is possible to change the configuration information.

Hereinabove, an embodiment of the present invention has been described in detail referring to the drawings. However, the detailed configuration is not limited to the one of the embodiment, and can include changes of design within the scope of the invention.

For example, in the above description, the execution instruction unit 112 uses RFID antennas according to the antenna use procedure 148 generated by the use procedure generation unit 111. Instead, the same function can be realized by lending and returning an RFID antenna from and to a list of RFID antennas. For example, a use list of RFID antennas is stored in the storage unit 14. The use list stores RFID antennas that can be used or RFID antennas that can not be used, for example. When the execution instruction unit 112 receives a request for an RFID antenna from a program that uses RFID antennas, the execution instruction unit 112 refers to the use list to judge whether the RFID antenna is used by another program, for example. Further, referring to the RFID reader/writer configuration information 145 and the antenna calibration information 147, the execution instruction unit 112 lends the RFID antenna requested if there is no problem in simultaneous use of the RFID antennas lent now and the requested RFID antenna. For judging whether a problem exists in simultaneous use of the RFID antennas lent now and the requested RFID antenna, the same operation as the one exemplified above may be employed. When this condition is not satisfied, the execution instruction unit 12 rejects lending.

Further, in the above description, the severity is determined by the number of times the tag ID can be read. Determination of the severity is not limited to this. For example, a value may be determined for each of applications performing writing and reading, RFID reader/writers performing writing and reading, and RFID antennas performing writing and reading. When a tag ID can not be read, the severity may be determined by a value of one of the application concerned, the RFID reader/writer concerned and the RFID antenna concerned or by a value of a combination of these.

In the case where the frequency 413 is "once" in the antenna use request information 146, the operation 412 corresponding to that frequency 413 is instructed at need by the application program 141 or the like, as described above. When the use procedure generation unit 111 receives such an instruction, the use procedure generation unit 111 may generate the antenna use procedure information 148 including the operation 412 corresponding to the frequency 413 "once", by performing processing similar to the above processing. In that case, in S703, the use procedure generation unit 111 may acquire also the RFID antenna 411 corresponding to the frequency 413 "once" and perform the following processing similarly to the above.

Further, in the above embodiment, to investigate interference using calibration RFID tags, reading is performed by all the RFID antennas to be operated. Thereafter, when operation designated in the antenna use request information 146 is "write", only the RFID antennas to perform writing are instructed to perform writing. Investigation of interference is not limited to this. For example, to investigate interference using calibration RFID tags, after reading is performed by all the RFID antennas to be operated, each of all the RFID antennas may be instructed to perform operation defined in the antenna use request information. In other words, to investigate interference using calibration RFID tags, it is sufficient that the RFID antennas can perform reading, and it dose not matter whether reading is requested by the application.

The invention claimed is:

1. A control method by an RFID control system comprising a plurality of RFID antennas each having a calibration RFID tag, one or more RFID reader/writers that perform reading by operating each of said RFID antennas, and a control unit that controls each of said RFID reader/writers, wherein:
   said control unit comprises a storage unit that stores an antenna use procedure including one or more use timings each in turn includes one or more RFID antennas to be operated simultaneously; and performs a control step in which the RFID antennas included in each of said use timings in said antenna use procedure read from said storage unit are operated simultaneously;
   each of said RFID reader/writers performs:
   a read step in which the RFID reader/writer in question reads information held by a calibration RFID tag through an RFID antennas; and
   an output step in which the RFID reader/writer in question outputs the read information to said control unit; and
   said control unit performs;
   a read result acquisition step in which the control unit receives the information read by each of RFID antennas that are operated simultaneously from each of said RFID reader/writers;
   a non-readable combination acquisition step in which the control unit acquires a combination of RFID antennas that do not read information held by the respective calibration RFID tags, among said RFID antennas that are operated simultaneously; and
   a update step in which, when the combination of RFID antennas that do not read information held by the respective calibration RFID tags is acquired, the RFID antennas included in each of said use timings in the antenna use procedure in said storage unit is changed to a combination that does not coincide with the acquired combination.

2. A control method according to claim 1, wherein:
   said storage unit further stores configuration information that indicates each of said RFID reader/writers and RFID antennas connected to each of said RFID reader/writers; and
   said control unit further performs:
   a combination acquisition step in which a combination of RFID antennas connected to a same RFID reader/writer is acquired from said configuration information read from said storage unit; and
   an antenna use procedure generation step in which the antenna use procedure is generated such that said procedure includes one or more use timings each including one or more RFID antennas to be operated simultaneously, and RFID antennas included in each use timing do not coincide with a combination of RFID antennas connected with one RFID reader/writer.

3. A control system comprising a plurality of RFID antennas each having a calibration RFID tag, one or more RFID reader/writers that perform reading by operating each of said RFID antennas, and a control unit that controls each of said RFID reader/writers, wherein:
   said control unit comprises:
   a storage unit that stores an antenna use procedure including one or more use timings each in turn including one or more RFID antennas;
   a control means that simultaneously operates RFID antennas included in each use timing included in the antenna use procedure read from said storage unit;
   a read result acquisition means;
   a non-readable combination acquisition means; and
   an update means; and
   each of said RFID reader/writer performs:
   a read step in which the RFID reader/writer in question reads information held by a calibration RFID tag through an RFID antennas; and
   an output step in which the RFID reader/writer in question outputs the read information to said control unit;
   said read result acquisition means receives information read by a plurality of RFID antennas that are operated simultaneously from each of said RFID reader/writers;
   said non-readable combination acquisition means acquires a combination of RFID antennas that do not read information held by the respective calibration RFID tags, among said RFID antennas that are operated simultaneously; and
   when the combination of RFID antennas that do not read information held by respective calibration RFID tags is acquired, said update means changes the RFID antennas included in each of said use timings in the antenna use procedure in said storage unit to RFID antennas that does not coincide with the acquired combination.

* * * * *